United States Patent
Beerana

(10) Patent No.: US 11,137,889 B2
(45) Date of Patent: Oct. 5, 2021

(54) ADAPTIVE INTERFACE TRANSFORMATION ACROSS DISPLAY SCREENS

(71) Applicant: Microsoft Technology Licensing, LLC, Redmond, WA (US)

(72) Inventor: Somasundaram Kumaresan Beerana, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/908,758

(22) Filed: Feb. 28, 2018

(65) Prior Publication Data

US 2019/0265869 A1    Aug. 29, 2019

(51) Int. Cl.
  *G06F 3/0484* (2013.01)
  *G06F 9/451* (2018.01)
(52) U.S. Cl.
  CPC ...... *G06F 3/04845* (2013.01); *G06F 3/04847* (2013.01); *G06F 9/451* (2018.02)
(58) Field of Classification Search
  CPC .. G06F 3/04845; G06F 9/451; G06F 3/04847; G06T 3/4092; G06T 2200/24; G09G 5/005; G09G 2340/04
  See application file for complete search history.

(56) References Cited

U.S. PATENT DOCUMENTS

| | | | |
|---|---|---|---|
| 7,675,529 B1 | 3/2010 | Brunner et al. | |
| 7,843,451 B2 | 11/2010 | Lafon | |
| 2002/0000998 A1* | 1/2002 | Scott | G06T 3/4084 345/667 |
| 2002/0071593 A1* | 6/2002 | Muratani | G06T 1/0064 382/100 |
| 2004/0163046 A1 | 8/2004 | Chu et al. | |
| 2004/0183817 A1* | 9/2004 | Kaasila | G06F 16/9577 345/660 |
| 2009/0003731 A1* | 1/2009 | Nitta | G06F 3/1423 382/298 |
| 2011/0184291 A1 | 7/2011 | Okamura et al. | |

(Continued)

FOREIGN PATENT DOCUMENTS

| | | |
|---|---|---|
| EP | 1975782 A1 | 10/2008 |
| EP | 2053592 A2 | 4/2009 |
| EP | 3185112 A1 | 6/2017 |

OTHER PUBLICATIONS

"International Search Report and Written Opinion Issued in PCT Application No. PCT/US19/018444", dated Jun. 14, 2019, 15 Pages.

(Continued)

*Primary Examiner* — Jennifer N To
*Assistant Examiner* — Ashley M Fortino
(74) *Attorney, Agent, or Firm* — Schwegman Lundberg & Woessner, P.A.

(57) ABSTRACT

A user interface is adaptive to multiple display screens with different characteristics. Interface elements of a user interface can be specified for a baseline display screen. Transformed interface elements suitable for a target display screen can subsequently be generated automatically from the interface elements specified for the baseline display screen. One or more transformations can be determined and applied to the interface elements to produce the transformed interface elements. Further, the interface elements are subject to different transformations.

20 Claims, 12 Drawing Sheets

(56) References Cited

U.S. PATENT DOCUMENTS

2013/0055055 A1\* 2/2013 Turcotte ............... G06F 40/106
                                                      715/201
2013/0063492 A1   3/2013 Washington et al.
2019/0266705 A1   8/2019 Beerana

OTHER PUBLICATIONS

"International Search Report and Written Opinion Issued in PCT Patent Application No. PCT/US19/018448", dated Jun. 12, 2019, 12 Pages.
"Non Final Office Action Issued in U.S. Appl. No. 15/908,754", dated May 10, 2019, 19 Pages.
"Final Office Action Issued in U.S. Appl. No. 15/908,754", dated Nov. 29, 2019, 18 Pages.

\* cited by examiner

ADAPTIVE INTERFACE TRANSFORMATION ACROSS DISPLAY SCREENS

CROSS-REFERENCE TO RELATED APPLICATIONS

This application is related to U.S. patent application Ser. No. 15908754 (Atty. Ref 403696-US-NP) of the same title and filed on the same date, the entirety of which is incorporated herein by reference.

BACKGROUND

Application user interfaces can be initially designed to support different display screen sizes or a single display screen size. User interfaces designed to run on different screens sizes are specified in a normalized form, independent of size. For example, design can be specified in terms of percentages, such as a button coded to be twenty percent from the left. Subsequently, the normalized form can be projected to different screen sizes. Application user interfaces designed to run on a particular display screen are written solely for that display screen. More specifically, the user interface can be hardcoded for the target screen. For example, a button can be specified statically in terms of screen pixels.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to adaptive user interface transformation across multiple display screens. Interface elements of a user interface hard coded for a specific display screen, namely a baseline display screen, are subject to automatic transformation suitable for a target display screen prior to rendering. A transformed encoded description of interface elements can subsequently be rendered in a displayable form, such as an image, and transmitted to a target display screen for display.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Figure 1:
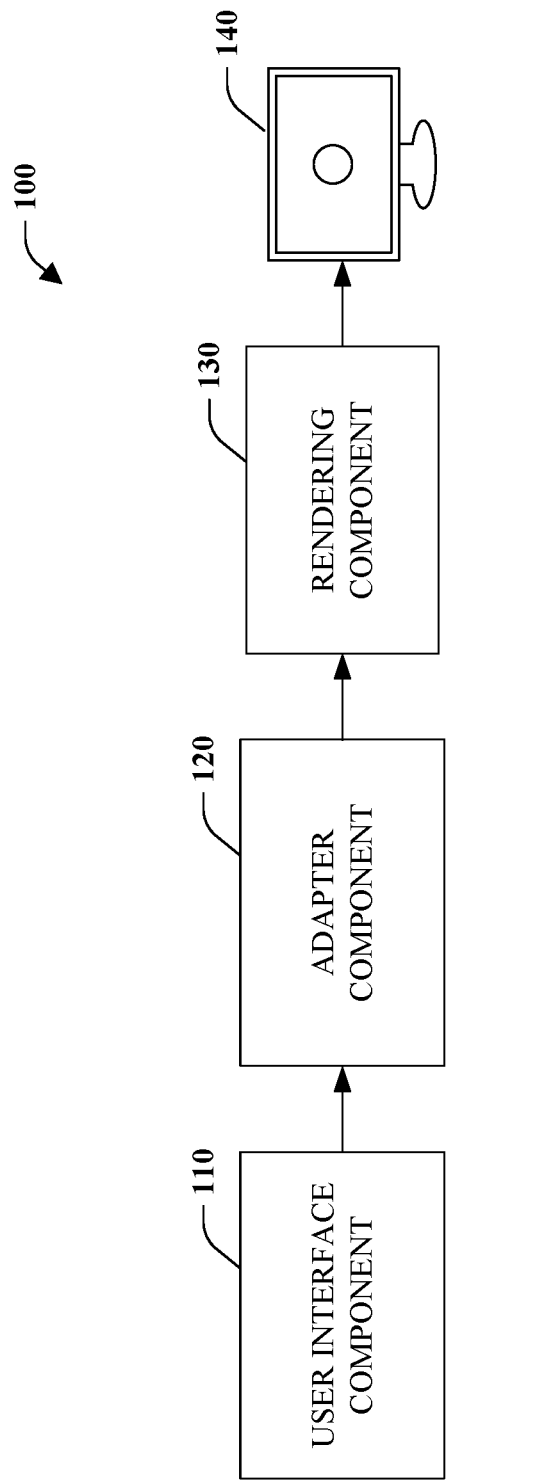
FIG. 1 is a block diagram of an interface transformation system.

An application user interface can be designed for a particular display screen configuration, for example in terms of dimensions and resolution. In this case, the user interface can be hardcoded for a display screen. For instance, an interface element of a user interface can be specified in terms of fixed pixel width and height. If porting of the application to different display screens is later desired, there are two options. First, the user interface can be refactored to support such porting. However, the required refactoring is an incredibly time and resource intensive process. Second, the user interface can be scaled to fit alternate screen sizes. Conventional scaling, however, results in imprecise rendering of a hardcoded user interface. As a result of loss of precision, the look and feel of the interface is not maintained. For example, interface elements can be jagged, shifted or cropped, and aspect ratio can be negatively affected.

Details below generally pertain to adaptive user interface transformation across multiple display screens. Interface elements of a user interface hardcoded for a specific display screen, namely a baseline display screen, are subject to automatic transformation suitable for a target display screen prior to rendering. More specifically, one or more transformations can be determined for each interface element, which can be the same or different transformations with respect to other interface elements, and subsequently applied to produce transformed interface elements. A transformed encoded description of interface elements can subsequently be rendered in a displayable form, such as an image, and transmitted to a target display screen for display.

One relevant transformation for differing display screen size is scaling. As opposed to uniform scaling a user interface as a whole, separate scaling can be performed for individual user interface elements. Moreover, the scaling can be performed prior to rendering the interface elements in a displayable form. This approach eliminates the loss of precision associated with conventional scaling and allows aspect ratio to be preserved if desired. Scaled dimensions of user interface elements can be automatically computed based on baseline display-screen characteristics and target display-screen characteristics. In one instance, scale factors can be computed by dividing corresponding target display-screen dimensions by baseline display-screen dimensions. Subsequently, scaled dimensions are computed by applying one or more scale factors to interface element dimensions. In accordance with one embodiment, at least a portion of the aforementioned scaling functionality can be embodied as a wrapper, or adapter, employed to automatically translate a user interface from a hardcoded baseline form to a target form prior to rendering.

Various aspects of the subject disclosure are now described in more detail with reference to the annexed drawings, wherein like numerals generally refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Referring initially to FIG. 1, an interface transformation system 100 is depicted. The transformation system 100 includes user interface component 110, adapter component 120, rendering component 130, and display device 140. The user interface component 110 specifies a user interface designed for a particular screen configuration of a display device. The adapter component 120 is configured to allow the user interface component 110 to be utilized with respect to a different screen configuration from the screen configuration for which the user interface was designed. Rendering component 130 receives adapted specification of a user interface and renders the corresponding user interface in a displayable form for display on the display device 140.

The user interface component 110 forms part of an application that specifies a user interface for display. Moreover, the user interface component 110 can be specified with respect to particular screen characteristics (e.g., size and resolution). In other words, the user interface 110 is designed to operate with respect to solely one screen configuration. For example, the user interface component 110 can be hardcoded with a screen configuration with width of 1368 pixels and height of 912 pixels. Rendering of the user interface on a smaller screen can result in significant portions of the interface being cropped and rendering of the user interface on a larger screen may result in the screen not being filled appropriately. Further, lines can be jittered or jagged with a staircase like effect when the user interface is rendered on a smaller or larger screen than the baseline.

The adapter component 120 is configured to enable a user interface, specified for a specific screen configuration, to be rendered in a different screen configuration in a manner that allows the look and feel of the user interface to be maintained. This can be accomplished by transforming interface elements of a user interface or generating transformed interface elements from the interface elements. For example, interface elements can be subject to transformations including scaling and translation (movement), among others with respect to maintaining a similar layout and interaction on different display screens. Furthermore, interface elements need be subject the same transformations but rather are subject to different transformations.

More specifically with respect to scaling, interface elements of a user interface can be scaled (e.g., enlarged or shrank) with a scale factor based on baseline display-screen characteristics and target display-screen characteristics. In accordance with one embodiment, a user can modify the user interface component 110 to invoke functionality of the adapter component 120. In another embodiment, the adapter component 120 can operate over a user interface without requiring a rewrite of the user interface, for example by automatically identifying hardcoded screen configuration information.

The rendering component 130 is configured to automatically generate an image or visual representation able to be displayed by the display device 140. As input, the rendering component 130 receives specification of the user interface as modified by the adapter. For example, an interface element can be specified in terms of baseline display-screen characteristics in a coded description of the interface element and a transformation can be applied to the coded description of the interface producing a transformed interface element prior to rendering. The rendering component 130 creates a displayable form of the transformed interface element from a coded description. The displayable form can be an image, such as a bitmap image.

More specifically, the render component 130 can be executed in two phases, namely rasterization and composition. Rasterization is a process of converting coded description or definition of a visual object to a pixel-based representation that can be displayed on a screen. For example, the render component 130 can allocate a memory buffer that serves as a bitmap image and begins to rasterize an interface element into that bitmap image pixel-by-pixel. After an interface element is rasterized into a bitmap image, the renderer component 130 can compose individual bitmap images of interface elements together to produce a displayable image that consider element opacity as well as transformations. Subsequently, the displayable form, bitmap image, can be transmitted, or otherwise made available, to a display screen for display.

In one particular instance, the rendering component 130 can automatically render an image in the resolution of the display device 140. Furthermore, in one instance the rendering component 130, by way of a transformed interface element generated by the adapter component 120, produces a version of the user interface that fills the screen of display device 140 as opposed to a letterbox format, wherein black bars or bands are inserted at the top and bottom or left and right to compensate for blank space.

The display device 140 is an output device for presentation of information in a visual form. The display device can be of any type including but not limited to a television set, computer monitor, mobile device display (e.g., smart watch, phone, laptop, tablet . . . ), and kiosk. The display device can also employ a myriad of different technologies including light-emitting diode display (LED), plasma display panel (PDP), liquid crystal display (LCD), organic light-emitting diode display (OLED), and projectors, among others. Further, the display device 140 is not limited to two-dimensional display types and technologies but can also encompass three-dimensional display types and associated technologies.

Figure 2:
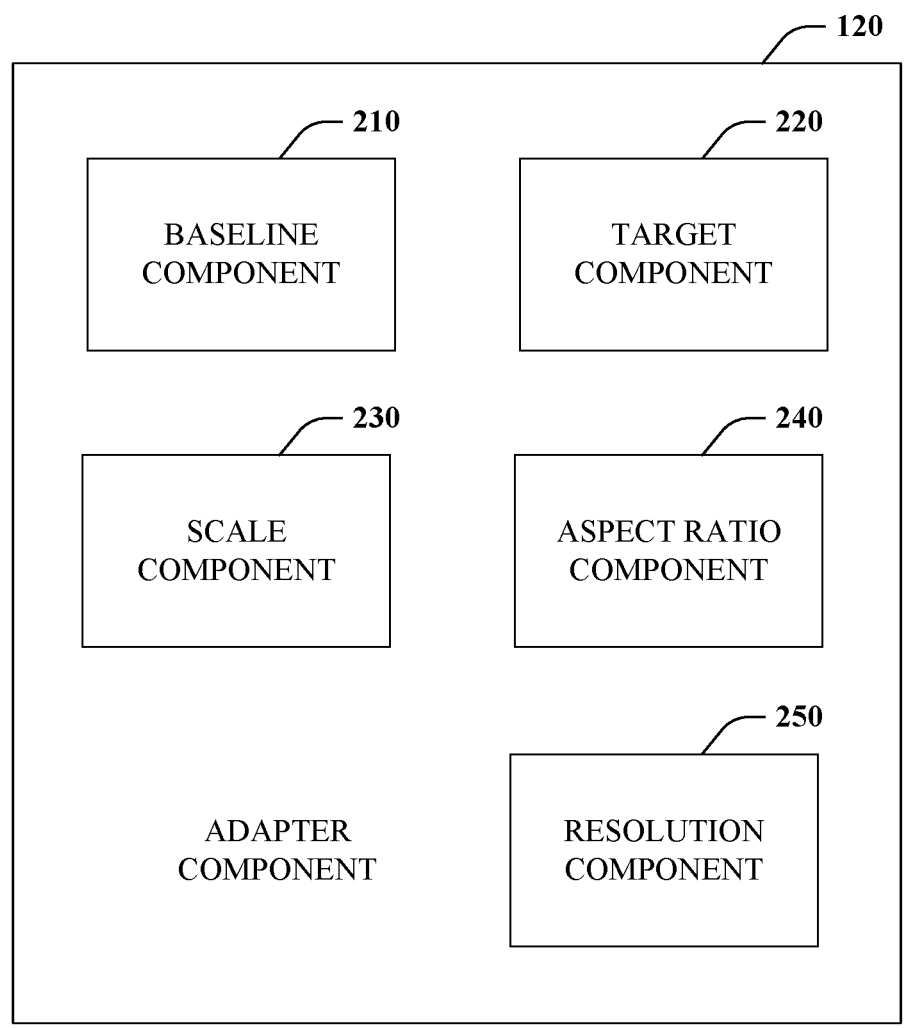
FIG. 2 is a block diagram of a representative adapter component.

Turning attention to FIG. 2, a representative adapter component 120 is illustrated in further detail. As shown, the adapter component 120 includes baseline component 210, target component 220, scale component 230, aspect ratio component 240, and resolution component 250. The baseline component 210 receives, retrieves, or otherwise obtains or acquires characteristics of a baseline display screen for which a user interface was designed. Baseline screen characteristics can include dimensions, such as width and height, as well as a resolution measurement (e.g., pixels per inch (PPI) or dots per inch (DPI)). The target component 220 receives, retrieves, or otherwise obtains or acquires characteristics of a target display screen on which the user interface is to be displayed. Like the baseline screen characteristics, the target screen characteristics can also include width and height dimensions as well as a resolution measurement (e.g., pixels per inch (PPI) or dots per inch (DPI)). The target screen characteristics can be requested from a user, an operating system, or a display device itself and received in response to the request.

The scale component 230 is configured to translate dimensions of a user interface specified with respect to a baseline display screen to a target display screen that is different from the baseline display screen. More particularly, the scale component 230 is directed toward scaling interface elements separately as opposed to as a whole. An interface element is a visual component of a user interface that facilitates user interaction with a computer and includes at least input controls (e.g., buttons, checkboxes, text fields . . . ), navigational components (e.g., search field, slider, icons, image carousel . . . ), and informational components (e.g., notifications, progress bar, message box . . . ). Moreover, an interface element can be specified with respect to a particular display screen for which the user interface was designed, namely a baseline display screen.

Dimensions can be computed based on a relationship between the characteristics of a baseline display screen and a target display screen. For example, a ratio of a target screen size to baseline screen size can be computed and utilized as a scale factor to produce computed dimensions for an interface element. In one instance, the scale component 230 can provide independent scaling along width and height based on screen width and screen height associated with baseline and target display screens. In this manner, the original look and feel of a user interface is preserved. In other words, aspects of design, such as shapes and layout ("look"), as well as behavior of elements, such as buttons, boxes, and menus ("feel"), are maintained.

While the scale component 230 can maintain the look and feel of a user interface, it may not preserve aspect ratio. The aspect ratio component 240 can perform scaling of an interface element in a manner that preserves aspect ratio. Aspect ratio refers to proportionate relationship between width and height. If differential scaling is applied to an interface element, scaling of the width and height are different, which may not preserve the aspect ratio of that interface element. For example, if differential scaling is performed on a circle the result may not be a circle but rather an ellipse. The aspect ratio component 240 performs uniform scaling to preserve the relationship between width and height. For example, the width of a target display screen can be divided by the width of the baseline display screen or the height of the target display screen can be divided by the height of the baseline display screen to produce a scale factor. The scale factor can then be used to compute the width and height of an interface element by multiplying the width and height by the same scale factor. In at least this instance, it is apparent that all interface elements are not scaled the same way or by the same scale factors.

The resolution component 250 is configured to enable scaling in light of different screen resolutions. Resolution corresponds to pixel density of an imaging device. The pixel density measurement associated with display screens is pixels per inch (PPI). However, this measurement is often referred to as dots per inch (DPI), a measurement more accurately associated with printer resolution. The resolution component 250 is configured to normalize screen dimensions based on the PPI. For example, if the PPI for the baseline display screen is 100 and the target display screen has a PPI of 200, the target display screen has twice as many pixels per inch as the baseline display screen. This can be normalized by dividing the width and height measurements of an interface element in pixels by two. More specifically, if the width and height of a target screen are 200 and the DPI is 200, these values can be normalized to a width of 100 and a height of 100. Differential or uniform scaling can then be performed with respect to these normalized dimensions. The rendering component 130 of FIG. 1 can subsequently ensure that a user interface is rendered at the resolution of the target display screen.

Figure 3:
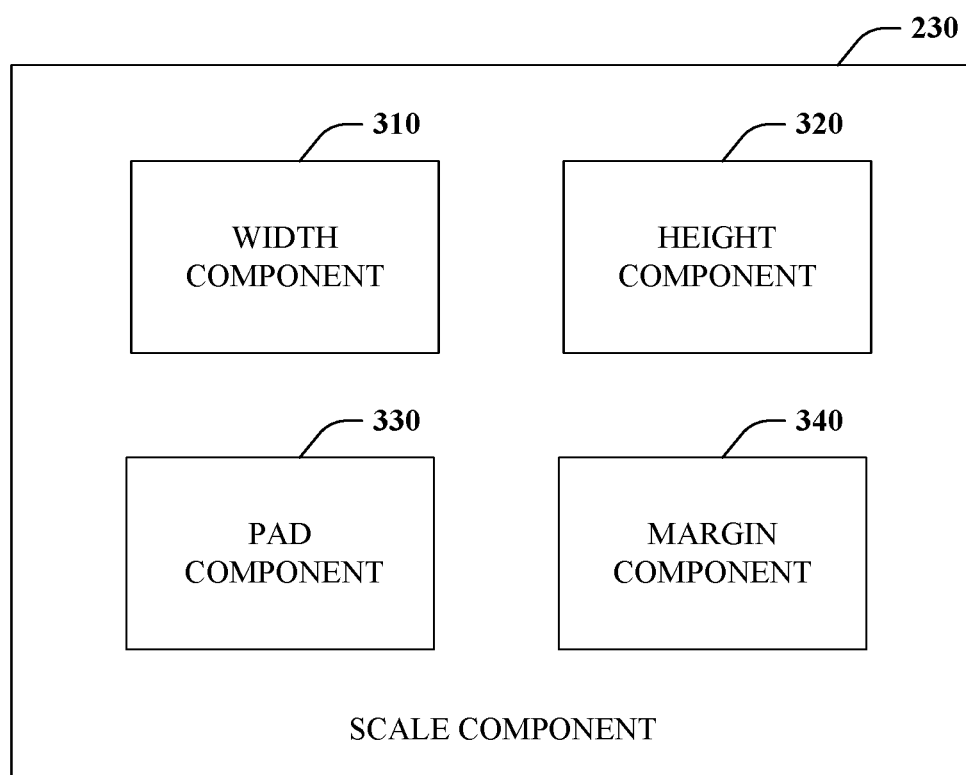
FIG. 3 is a block diagram of a representative scale component.

FIG. 3 depicts a representative scale component 230 in further detail. The scale component 230 includes a plurality of subcomponents including width component 310, height component 320, pad component 330, and margin component 340. The width component 310 is a mechanism configured to compute a new width of an interface element. First, the width component 310 can divide the baseline screen width by the target screen width to produce a width scale value. Next, the width component 310 can multiply the width scale value by the width of an interface element as specified with respect to the baseline display screen. The result is a computed width dimension for rendering in the target display screen.

The height component 320 operates similar to the width component 310 but in the vertical direction as opposed to the horizontal direction. More specifically, the height component is configured to compute a new height for an interface element. This can be accomplished by dividing the baseline screen width by the target screen width to produce a height scale value. The height scale value is subsequently multiplied by the height of an interface element as specified with respect to the baseline display screen. The result is a computed height dimension for rendering in the target display screen.

The pad component 330 is configured to compute padding of an interface element with respect to a target screen. Padding corresponds to internal space between the body of an interface element and its edge. For example, padding can define spacing between a button border and button text. Padding can have horizontal and vertical properties, such as left, right, top, and bottom. The pad component 330 can compute new padding based on the width scale value and the height scale value. More specifically, the width scale value can be applied to the horizontal properties (e.g., left and right) and the height scale value can be applied to the vertical properties (e.g., top and bottom). If padding for an interface element is not defined or the field is empty, this can indicate no padding is present.

The margin component 340 is configured to compute a margin associated with a target display screen. Unlike padding which represents an internal space, margin represents space external to an interface element. For example, a margin can specify space outside an edge or border separating interface elements from each other. However, margins may overlap. Margins can also have horizontal and vertical properties, such as left, right, top, and bottom. The margin component 340 can apply scale factors to a margin. More specifically, the width scale value can be applied to horizontal properties (e.g., left and right), and the height scale value can be applied to the vertical properties (e.g., top and bottom).

Figure 4A:
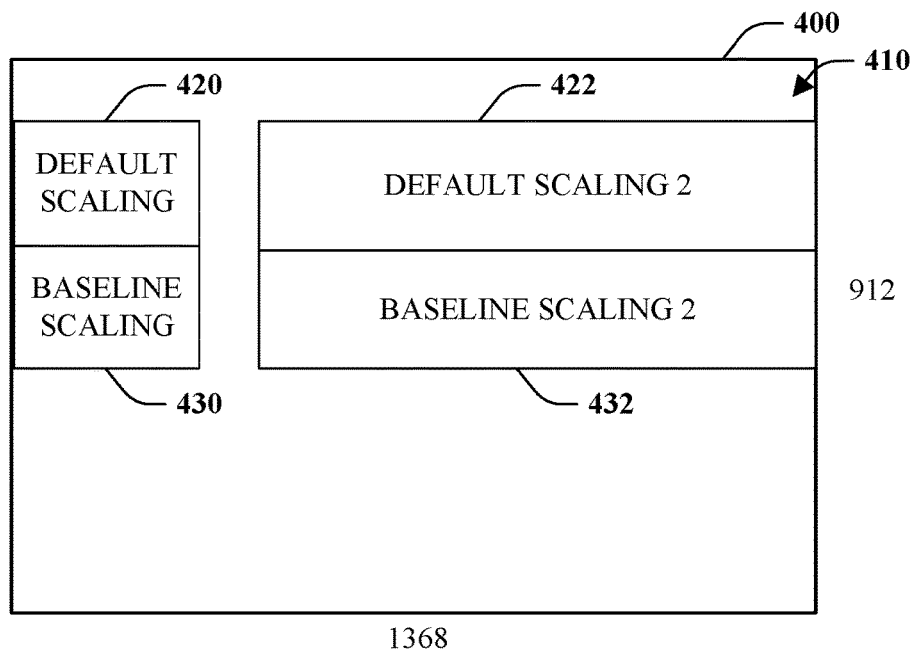
FIG. 4A is an exemplary visualization on a baseline screen.
Figure 4B:
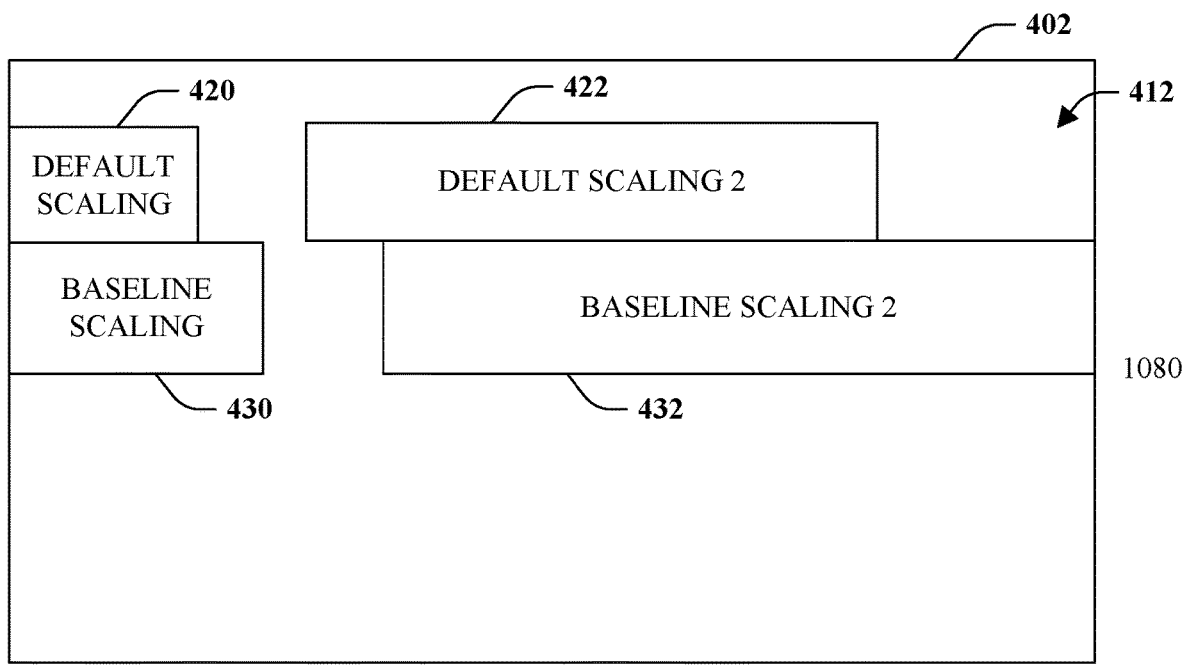
FIG. 4B is an exemplary visualization on a target screen.

Turning attention to FIGS. 4A-B, exemplary visualizations on different display screens are depicted. These visualizations represent simple interface elements rendered on a baseline display screen and a target display screen. Of course, these are simply examples to clarify aspects of the disclosure and are not meant to limit the disclosure in any way.

FIG. 4A shows a visualization 410 rendered on baseline display screen 400. Here, the baseline display screen 400 has a width of 1368 pixels and a height of 912 pixels. The screen has four interface elements, namely buttons 420, 422, 430, and 432. More specifically the first row of buttons 420 and 422 are configured as follows:

```
<StackPanel Orientation="Horizontal">
    <Button
        Width="300"
        Height="200"
        Content="DEFAULT SCALING"
        Style="{StaticResource BaseButtonStyle}" />
    <Button
        Width="900"
        Height="200"
        Margin="165,0,0,0"
        Style="{StaticResource BaseButtonStyle}"
        Content="DEFAULT SCALING 2" />
</StackPanel>
```

Note the hardcoded values of widths, heights, and margin. The second row of buttons 430 and 432 are configured as follows:

```
<StackPanel Orientation="Horizontal">
    <Button
        local:Pro4.Width="300"
        local:Pro4.Height="200"
        Content="BASELINE SCALING"
        Style="{StaticResource BaseButtonStyle}" />
    <Button
        local:Pro4.Width="900"
        local:Pro4.Height="200"
        local:Pro4.Margin="165,0,0,0"
        Style="{StaticResource BaseButtonStyle}"
        Content="BASELINE SCALING 2" />
</StackPanel>
```

The buttons 430 and 432 are mutable but are currently set to the same values as buttons 420 and 422 since they are being presented in the baseline display screen.

FIG. 4B illustrates a visualization 412 on a target display screen 402. The target display screen 402 is different in size from the baseline display screen 400. The target display screen 402 is larger with a width of 1920 pixels and a height of 1080 pixels. To address the larger size screen, the first row of buttons 420 and 422 are scaled using a default scaling technique in which the aggregate of the two buttons are scaled together. The result is the look and feel of the buttons rendered in the baseline display screen 400 is not preserved in the target display screen 402. More specifically, the buttons 420 and 422 do not fill the screen properly, which is evident since the button 422 is not right aligned.

By contrast, buttons 430 and 432 are scaled individually and based on a relationship between the baseline display screen 400 and the target display screen 402. First, a width scale factor is computed by dividing the target width of 1920 pixels by the baseline screen width of 1368 pixels, the result of which is about 1.40351. The width scale value is then applied to the width of the buttons 430 and 432 resulting in computed widths of 421.053 pixels and 1263.16 pixels, respectively. The width scale value can also be applied to the margin of the button 432, resulting in the computed margin of 231.579, 0, 0, 0. Second, a height scale factor is computed by dividing the target height of 1080 pixels by the baseline height of 912 pixels, resulting in about 1.18421. The height scale factor is then applied to the height of the button 430 and 432 producing computed heights of 236.842 pixels for both. The result is the look and feel of the button 430 and 432 rendered on the baseline display screen 400 is maintained on the target display screen 402.

Figure 5:
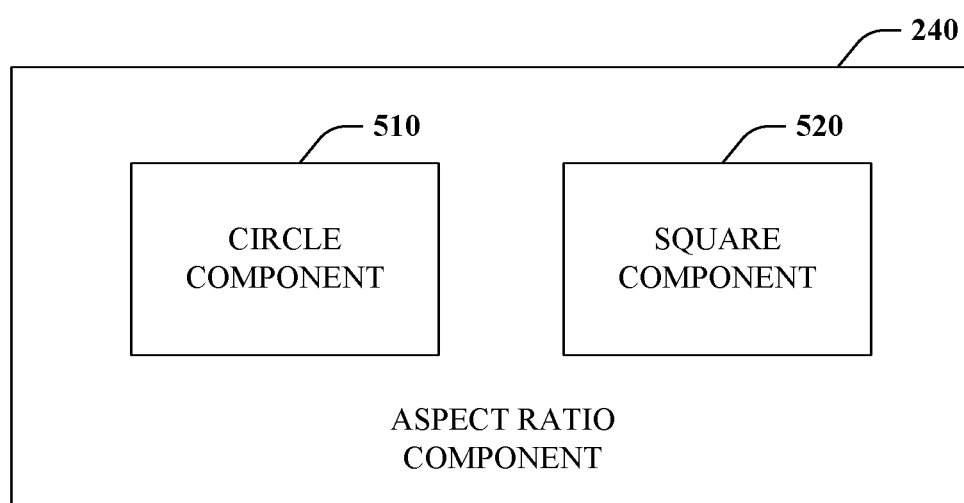
FIG. 5 is a block diagram of a representative aspect ratio component.

Referring now to FIG. 5, a representative aspect ratio component 240 is illustrated in further detail. The aspect ratio component 240 includes circle component 510 and square component 520. The circle component 510 is configured to scale a circle in a manner that preserves aspect ratio. In other words, a scaled circle is still a circle and not an ellipse, for example. To preserve the aspect ratio, the circle component 510 applies either a width scale factor or a height scale factor to the diameter of a circle. The circle component 510 can acquire either scale factor from the width or height components of FIG. 3. Alternatively, the circle component 510 can compute the scale factor, for example by dividing a target screen dimension by a corresponding baseline screen dimension. The square component 520 is configured to preserve the aspect ratio of a square during scaling. As result, a scaled square is still a square rather than a rectangle. Uniform scaling of the width and height can preserve the aspect ratio of a square. In other words, the width and height are scaled by the same factor, such as the width scale factor or the height scale factor. The scale factor can be acquired from the width or height component of FIG. 3 or computed by the square component 520 itself, for example by dividing a target screen dimension by a corresponding baseline screen dimension.

Figure 6:
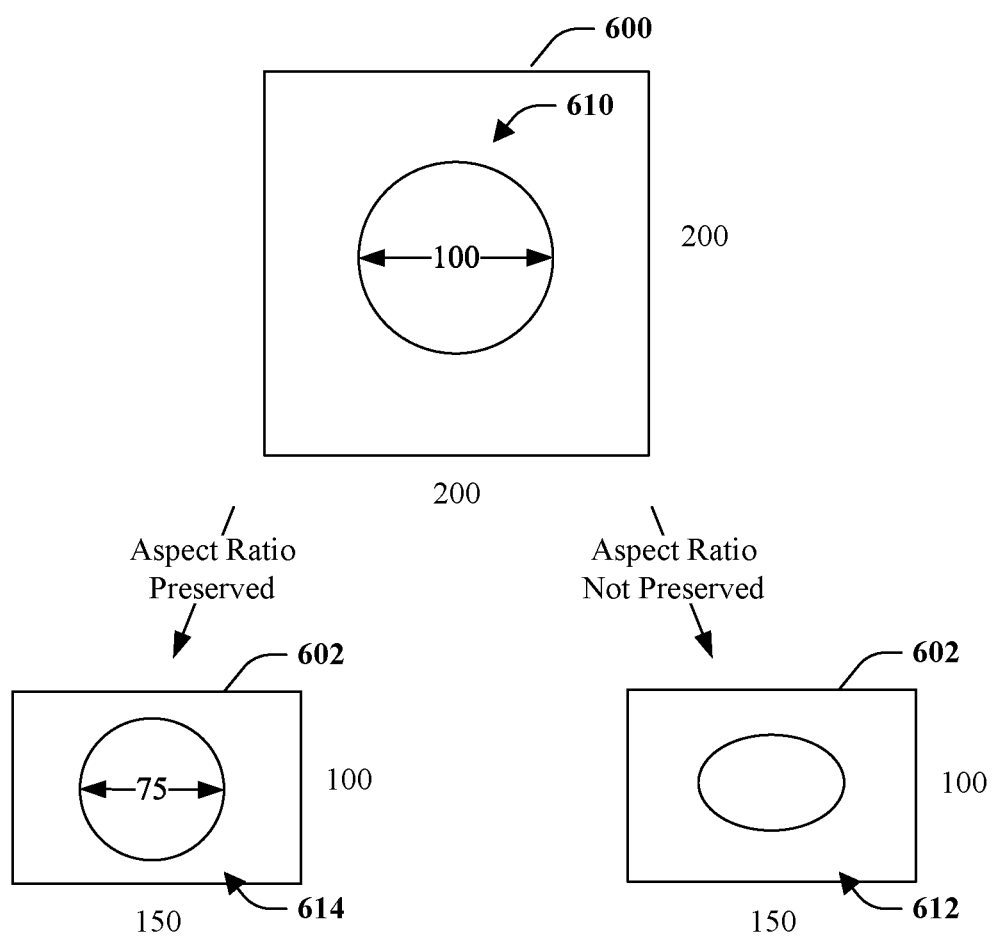
FIG. 6 illustrates an example of scaling a circle interface element.
Figure 7:
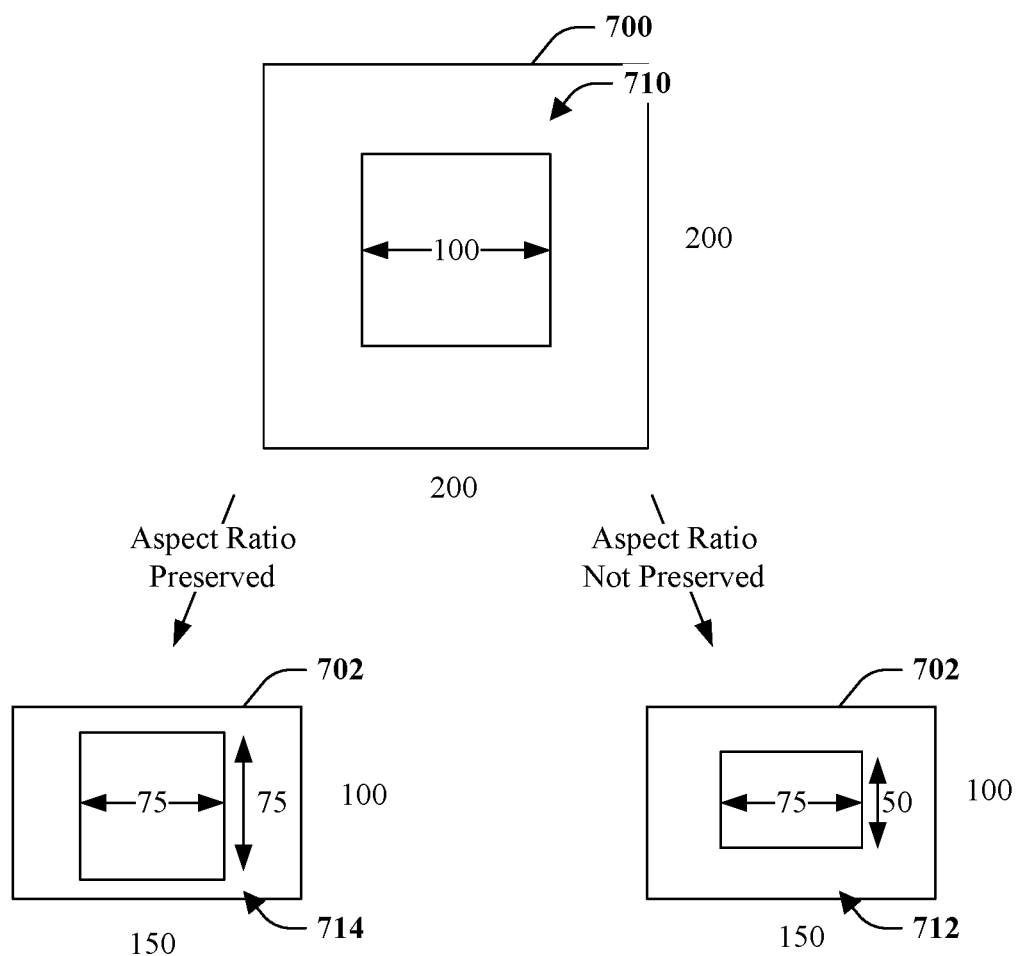
FIG. 7 depicts exemplary scaling of a square interface element.

FIG. 6 illustrates scaling of a circle interface element. As shown, a circle element 610 is rendered in baseline display screen 600. The circle element 610 has a diameter of 100 pixels, and the baseline display screen 600 has a width of 200 pixels and a height of 200 pixels. A target display screen 602 has a width of 150 pixels and a height of 100 pixels. If scaling is performed without maintaining the aspect ratio of the circle element 610, different scale factors for width and height are utilized, which results in rendering of an ellipse element 612. By contrast, if aspect ratio is to be preserved, a single scale factor can be employed to compute the diameter of a circle. For example, a width scale factor can be computed by dividing the target screen width of 150 pixels by the baseline screen width of 200 pixels. The result is a width scale factor of 0.75 or three quarters. The diameter of the circle element 610 on the baseline screen 600 is 100 pixels. Applying the width scale factor of 0.75 to the diameter of 100 pixels results in a computed diameter of 75 pixels. A scaled circle element 614 is then rendered with the computed diameter of 75 pixels, and the aspect ratio is preserved FIG. 7 depicts scaling of a square interface element. As shown, a baseline display screen 700 displays a square element 710. The baseline display screen 700 has a width of 200 pixels by 200 pixels. The square has a height and width of 100 pixels. The target display screen 702, in this example, has a width of 150 pixels and a height of 100 pixels. If scaling is not performed in a manner in which aspect ratio is maintained, the width and the height of the square element 710 are differentially scaled. Based on the relationship between the target screen size and the baseline screen size, the width scale factor is 0.75 (target width/baseline width-→150/200=0.75) and the height scale factor is 0.5 (target height/baseline height-→100/200=0.5). Applying the width scale factor (0.75) to the width of the square element (100 pixels) results in a computed width of 75 pixels. Applying the height scale factor (0.5) to the height of the square element (100 pixels) results in a computed height of 50 pixels. The result of scaling is rectangle element 712. Conversely, if aspect ratio is to be preserved, a single scale factor can be applied to both the height and width of the square element 710. For example, the width scale factor of 0.75 can be applied to the width and height, to produce scaled square element 714 that has a width of 75 pixels and a height of 75 pixels.

Interface elements of a user interface can be subject to different transformations. One or more transformations can be determined for an interface element, and each interface element can be considered separately. In one instance, transformations can differ based on the applicability and inapplicability of aspect ratio preservation. Stated differently, transformations can differ based on whether or not aspect ratio is to be preserved for an interface element, which can be specified directly or indirectly by the interface element. For example, transformations can differ if aspect ratio preservation is inapplicable for a first interface element and aspect ratio preservation is applicable for a second interface element. In the case of scaling, the transformation can correspond to differential scaling with respect to the first interface element and uniform scaling with respect to the second interface element. More specifically, the first interface element is subject to scaling of height and width by different factors since aspect ratio need not be preserved, and the second interface element is subject to scaling width and height by the same factor to preserve the proportionality of the second interface element since aspect ratio is to be maintained.

The aforementioned systems, architectures, environments, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, various portions of the disclosed systems above and methods below can include or employ artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

In view of the exemplary systems described above, methodologies that may be implemented in accordance with the disclosed subject matter will be better appreciated with reference to the flow charts of FIGS. 8-11. While for purposes of simplicity of explanation, the methodologies are shown and described as a series of blocks, it is to be understood and appreciated that the disclosed subject matter is not limited by the order of the blocks, as some blocks may occur in different orders and/or concurrently with other blocks from what is depicted and described herein. Moreover, not all illustrated blocks may be required to implement the methods described hereinafter.

Figure 8:
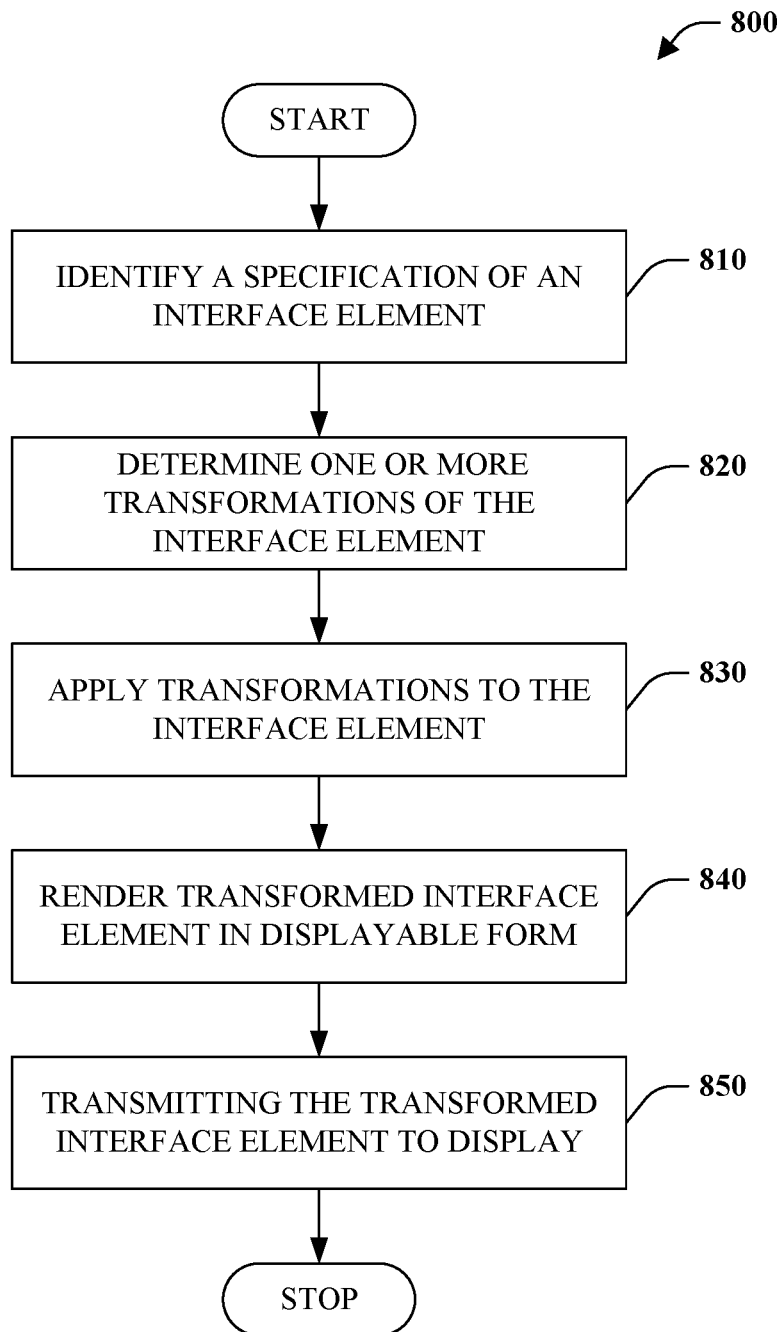
FIG. 8 is a flow chart diagram of an interface transformation method.

FIG. 8 illustrates an interface transformation method 800. At reference numeral 810, specification of an interface element is identified. For instance, the specification can be a coded description or definition (e.g., XAML) of an interface element. The interface element can form at least part of a user interface, such as the user interface component 110. The interface element is a visual object that facilitates user interaction with a computer and includes at least input controls (e.g., buttons, checkboxes, text fields . . . ), navigational components (e.g., search field, slider, icons, image carousel . . . ), and informational components (e.g., notifications, progress bar, message box . . . ). Moreover, the interface element can be specified with respect to a particular display screen for which the user interface was designed, namely a baseline display screen. At reference numeral 820, one or more transformations for the interface element are determined with respect to a target display screen, such as scaling or translation. The transformations can correspond to modifications to an interface element description or definition to preserve look and feel of an interface. At reference numeral 830, the one or more determined transformations are applied to a coded description of the interface element prior to rendering. In accordance with one embodiment, an adapter, or wrapper, such as adapter component 120 can be invoked which determines and applies the transformations to the interface element. At numeral 840, a transformed interface is rendered in a displayable form. More specifically, a coded description with one or more applied transformations is subject to a rendering process which creates the displayable form of the interface element from the coded description of the interface element such as a bitmap image. At reference numeral 850, the transformed interface element in a displayable form is transmitted to, or otherwise made available for, display on a target display screen.

In accordance with one embodiment, the transformation determined and applied by method 300 can be scaling. However, such scaling is performed in a different manner than conventionally accomplished. The interface scaling provided herein does not scale visual representations of interface elements for a target display screen. Instead, a new size of an interface is computed for the target screen to be rendered without any loss of precision. For example, consider a diagonal line with coordinates (0, 0) and (100, 100) to be rendered in a target screen have the size of the baseline screen. With conventional scaling, the rendered line will be scaled pixel by pixel and appear jittered or jagged. As described herein, the size of the line is reset to (0, 0) and (50, 50). When the line is later rendered, the rendered line is not scaled but rendered without loss of visual precision for the target screen.

Furthermore, the transformation determined for one interface element can be the same or different from the transformation for another interface element. More specifically, one or more transformations for a first interface element can be determined separate from one or more transformations for a second interface element. As an example, different scaling can be performed with respect to first and second elements. For instance, uniform scaling of width and height can be selected for a first interface element to preserve the aspect ratio of the first interface element and differential scaling of width and height can be selected for the second interface element. By contrast, if aspect ratio preservation is applicable or inapplicable to both the first interface element and the second interface element the transformation can be the same.

Figure 9:
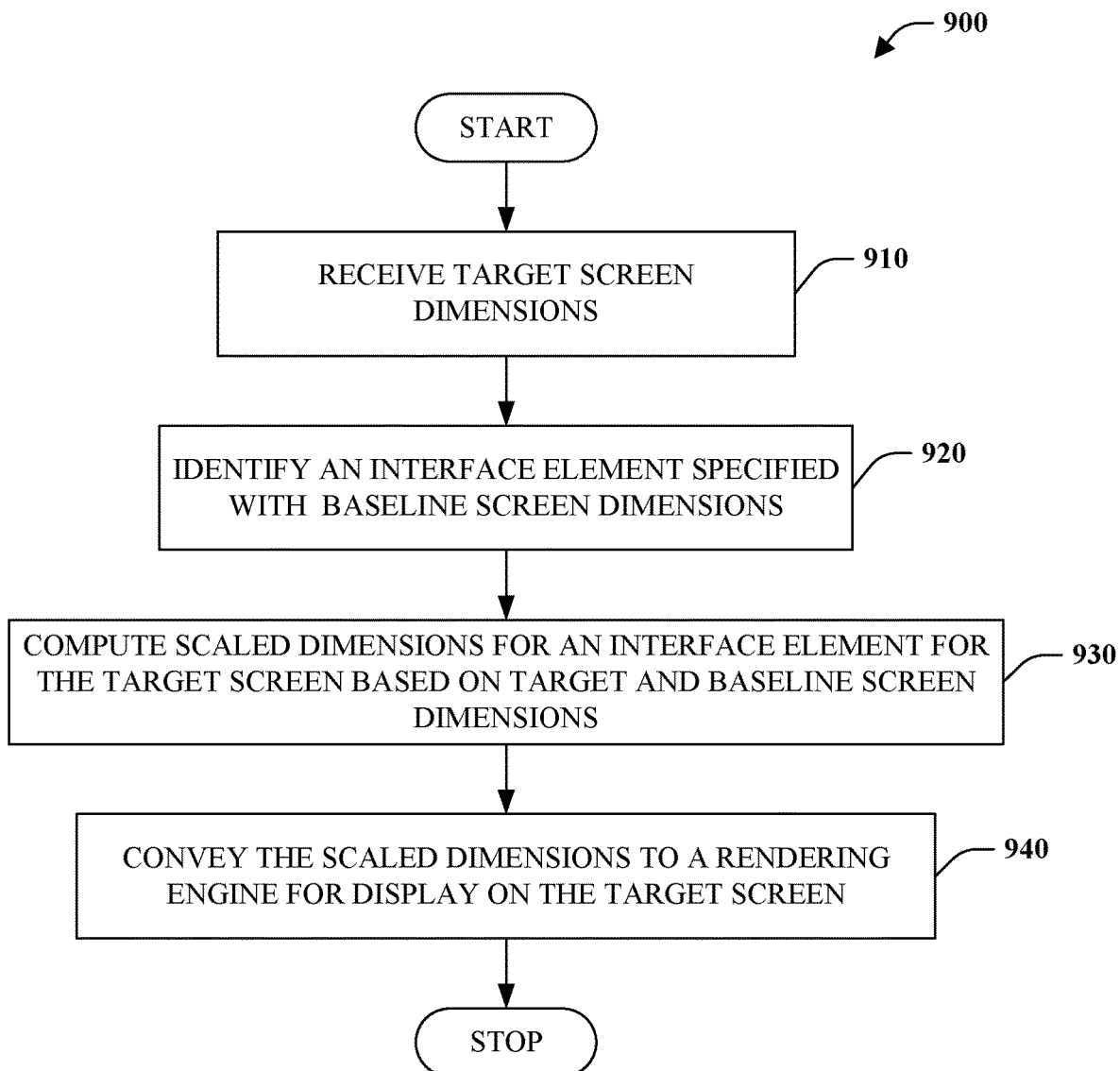
FIG. 9 is a flow chart diagram of a method of scaling interface elements.

Referring to FIG. 9, a flow chart diagram is depicted of a method of scaling interface elements 900. At reference numeral 910, target screen dimensions are received. The target screen dimensions can be provided, for instance, by a user, operating system, or target display device. For example, a request can be made on a computing device for the screen height and width of the device display screen, wherein the device display screen is the target display screen.

At reference numeral 920, an interface element specified with respect to baseline screen dimensions is identified. The interface element can comprise at least part of a user interface. Furthermore, the user interface can be hardcoded with respect to a particular device display screen, namely the baseline display screen. In other words, dimensions are specific static values with respect to the baseline display screen.

At numeral 930, scaled dimensions are computed for the identified interface element. The scaled dimensions are computed based on target and baseline screen dimensions and dimensions of the interface itself. For example, scale factors can be computed based on a relationship between target and baseline screen sizes. Subsequently, one or more scale factors can be applied to dimensions of the interface element to compute scaled dimensions for the interface element.

At reference numeral 940, scaled dimensions are conveyed for presentation on the target display screen. In accordance with one aspect, the scaled dimensions can be conveyed to a rendering engine, which renders the interface visually on the target display screen. In other words, the identified interface element is rendered in a displayable form for presentation on the target display screen.

Figure 10:
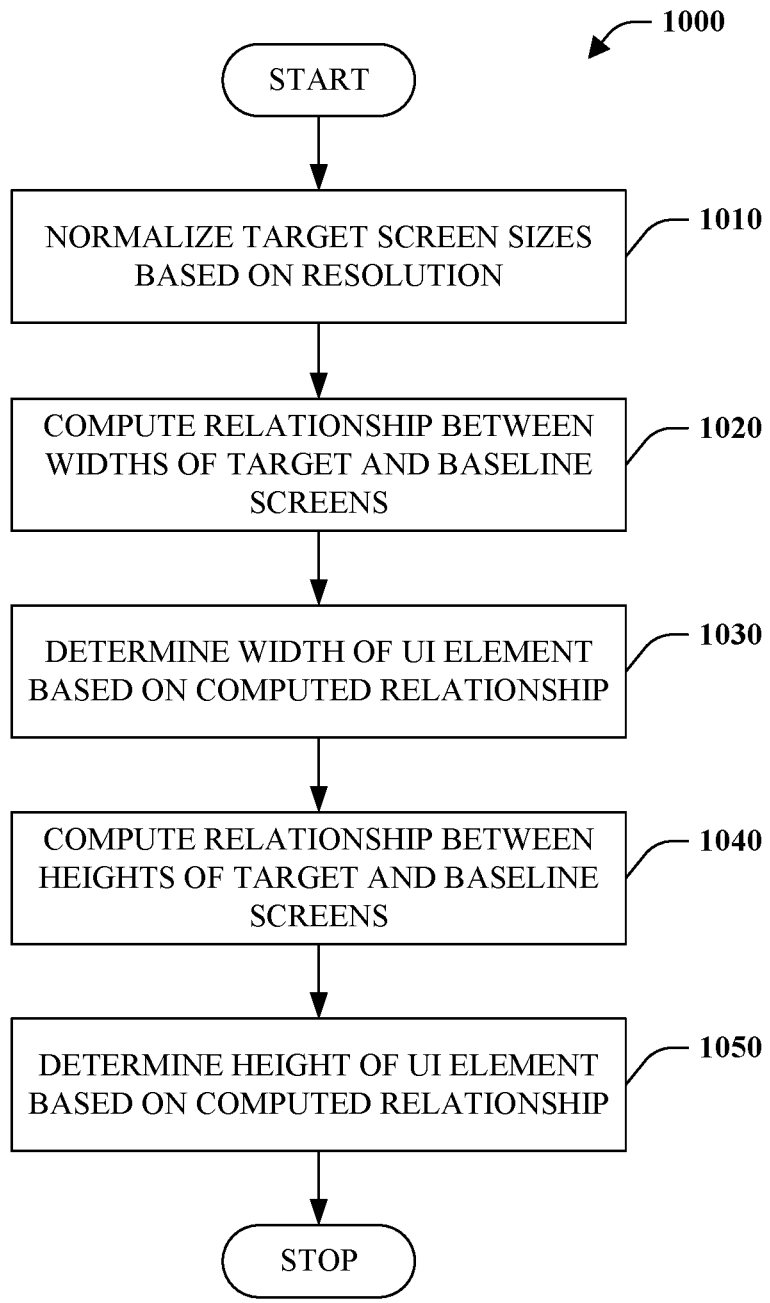
FIG. 10 is a flow chart diagram of a method of computing scaled dimensions for an interface element.

FIG. 10 depicts a method of computing scaled dimensions of an interface element. At numeral 1010, target screen dimensions are normalized based on target screen resolution. For instance, the target screen dimensions can be divided by a pixel density measurement of resolution to allow comparison of dimensions at the same resolution as the baseline display screen. At 1020, a relationship between widths of target and baseline display screens is computed. In other words, a ratio of the target screen width to the baseline screen width can be computed by dividing the width of a target display screen by the width of the baseline display screen. A width of a user interface element can be determined based on the computed relationship, at numeral 1030. In particular, the computed ratio can be used as a scale factor that can be applied to the width of a user interface element to produce a scaled width. At reference numeral 1040, a relationship between heights of target and baseline screens is computed. In one instance, a ratio of the target screen height to the baseline screen height can be computed by dividing the height of the target display screen by the height of the baseline display screen. At 1050, the height of the user interface element can be computed based on the relationship. More particularly, the ratio can be employed as a scale factor that can be applied to the height of a user interface element to produce a scaled height.

Figure 11:
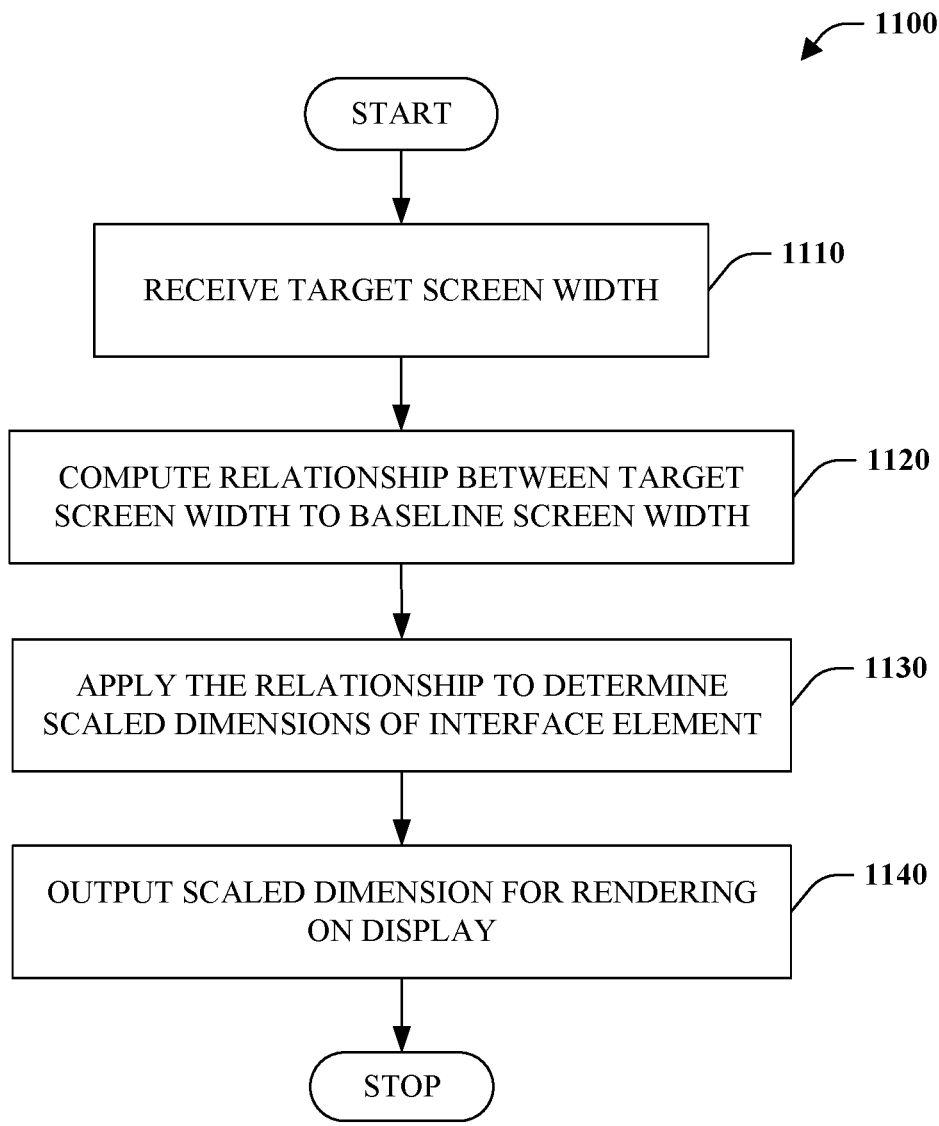
FIG. 11 is a flow chart diagram of a scaling method that preserves aspect ratio.

FIG. 11 is a flow chart diagram illustrating a scaling method 1100 that preserves aspect ratio. At reference numeral 1110, a target screen width is received. For example, the target screen width can be requested from a user, machine, or software and received in response to the request. At numeral 1120, a relationship is computed between target screen width and baseline screen width. For instance, a ratio can be computed by dividing the target screen width by baseline screen width. The computed relationship is subsequently applied to determine scaled dimensions of an interface element, at 1130. More specifically, the relationship can correspond to a scale factor that can be applied to the width and height of an interface element. By employing a uniform scale factor to width and height proportions of the interface element are maintained. At numeral 1140, the scaled dimensions of an interface element are output for rendering on a display, for instance by a rendering component.

Aspects of the subject disclosure pertain to the technical problem of porting a user interface to different display screens. The technical features associated with addressing this problem comprise generating and applying one or more transformations to coded characteristics of an interface element suitable to preserve the look and feel of a user interface when displayed on a target display screen. For instance, scale factors can be generated based on a relationship between target and baseline screen dimensions and resolution. Scale factors can then be applied separately to each interface element comprising a user interface to produce scaled dimensions. The scaled dimensions can then be employed to render interface elements on a target display screen.

In accordance with one particular embodiment, a user interface, and more specifically interface elements that make up the user interface, can be specified in extensible application markup language (XAML). Among other things, XAML supports attachable properties such that new properties can be added to interface elements. Through these properties a wrapper or adapter can be invoked and utilized. Consider for instance the following sample XAML code associated with specifying a button:

```
<Style
    x:Key="DeleteButtonStyle"
    BasedOn="{StaticResource RigelTextOnlyButtonButtonStyle}"
    TargetType="view:SkypeButton">
    <Setter Property="Content" Value="{StaticResource DeleteIcon}" />
    <Setter Property="FontFamily" Value="{StaticResource SkypeUISymbol}" />
    <Setter Property="FontSize" Value="22.5" />
    <Setter Property="utils:SurfacePro.Height" Value="{StaticResource DeleteButtonHeight}" />
    <Setter Property="Padding" Value="0" />
    <Setter Property="VerticalAlignment" Value="Center" />
    <Setter Property="VerticalContentAlignment" Value="Center" />
    <Setter Property="utils:SurfacePro.Width" Value="{StaticResource DeleteButtonWidth}" />
</Style>
```

Here, specification of "utils" in an attached property invokes a wrapper or adapter to generate scaled height and width. Sample code associated with his wrapper or adapter utility is provided in Appendix A herein.

Appendix A provides sample code associated with various features disclosed herein. Consider for example, "Circle," which describes maintaining aspect ratio for a circle interface element. Additionally, in the "Helpers" region there is code for calculated scaled width and height as well as dividing the width and height by a pixel density measurement to normalize the dimensions based on resolution.

The subject disclosure supports various products and processes that perform, or are configured to perform, various actions regarding user interface scaling. What follows are one or more exemplary systems and methods.

A system that performs interface transformation adaptive to different display screens, comprising: a processor coupled to a memory, the processor configured to execute computer-executable instructions stored in the memory that when executed by the processor cause the processor to perform acts comprising: identifying a first interface element and a second interface element of a user interface specified with respect to a baseline display screen; determining transformations for the first interface element and the second interface element adaptive for display on a target display screen based on target display-screen characteristics and baseline display-screen characteristics, wherein the transformations for the first interface element are determined separate from the second interface element; applying the transformations to the first interface element and the second interface element to produced transformed interface elements; and transmitting the transformed first interface element and second interface element to the target display screen for display. The system further comprising determining for one of the first interface element or the second interface element that aspect ratio preservation is applicable, and selecting a uniform scale factor to scale interface element width and height as the transformation. The system further comprising determining for one of the first interface element or the second interface element, aspect ratio preservation is inapplicable, and selecting a differential scale factor to scale interface element width and height as the transformation. Determining the transformations further comprising computing scale factors for dimensions of an interface element by dividing target display-screen dimensions by corresponding baseline-display screen dimensions. The system further comprising dividing width of a target display-screen by width of the baseline display screen to produce a width scale factor. The system of further comprising selecting the width scale factor as a uniform scale factor transformation for an interface element that indicates aspect ratio preservation is applicable. The system further comprising dividing height of the target display screen by the height of the of baseline display screen to produce a height scale factor. The system of further comprising selecting the height scale factor as a uniform scale factor transformation for an interface element that indicates aspect ratio preservation is applicable. The system further comprising selecting differential scaling by the width scale factor and the height scale factor as the transformation for an interface element for which aspect ratio preservation is inapplicable.

A method of user interface transformation performed by a system comprising at least one processor coupled to a memory storing machine-executable instructions, which, when executed by the processor, controls the system to perform acts, comprising: identifying a first interface element and a second interface element of a user interface specified with respect to a baseline display screen; determining transformations for the first interface element and the second interface element for display on a target display screen based on target display-screen characteristics and baseline display-screen characteristics, wherein the transformations for the first interface element are determined separate from the second interface element; applying the transformations to the first interface element and the second interface element; and transmitting the transformed first interface element and second interface element to the target display screen for display. The method further comprising selecting different transformations to apply for the first interface element and the second interface element when aspect ratio preservation is applicable to solely one of the first interface element or the second interface element. The method further comprising selecting the same transformation for the first interface element and the second interface element when aspect ratio preservation is inapplicable for the first interface element and the second interface element or aspect ratio preservation is applicable for the first interface element and the second interface element. Determining the transformations further comprising dividing width of a target display-screen by width of the baseline display screen to produce a width scale factor. The method further comprising selecting uniform scaling as the transformation, wherein the width scale factor is applied to both the width and height of at least one of the first interface element or the second interface element to preserve aspect ratio. Determining the transformations further comprising dividing height of the target display screen by height of the of baseline display screen to produce a height scale factor. The method further comprising selecting differential scaling as the transformation, wherein the width scale factor is applied to width and the height scale factor is applied to height of a least one of the first interface element or the second interface element.

A system that performs interface transformation adaptive to different display screens, comprising: a first interface element and a second interface element of a user interface specified with respect to a baseline display screen; means for determining transformations for the first interface element and the second interface element adaptive for display on a target display screen based on target-display-screen characteristics and baseline display-screen characteristics, wherein the transformations for the first interface element are determined separate from the transformations for second interface element; means for applying the transformations to the first interface element and the second interface element; and means for transmitting the transformed first interface element and the second interface element to the target display screen for display. The means for determining transformations further comprises determining different transformations for the first interface element and the second interface element when aspect ratio preservation is applicable to solely one of the first interface element or the second interface element. The means for determining transformations further comprising dividing target display-screen dimensions by corresponding baseline display-screen dimensions generating a width scale factor and a height scale factor. The means for determining transformations further comprises selecting a uniform scale factor of either the width scale factor or the height scale factor to scale width and height of the first interface element and selecting a differential scale factor the width scale factor to the width and the height scale factor to the height of the second interface element.

As used herein, the terms "component" and "system," as well as various forms thereof (e.g., components, systems, sub-systems . . . ) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The conjunction "or" as used in this description and appended claims is intended to mean an inclusive "or" rather than an exclusive "or," unless otherwise specified or clear from context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'" is satisfied under any of the foregoing instances.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 12:
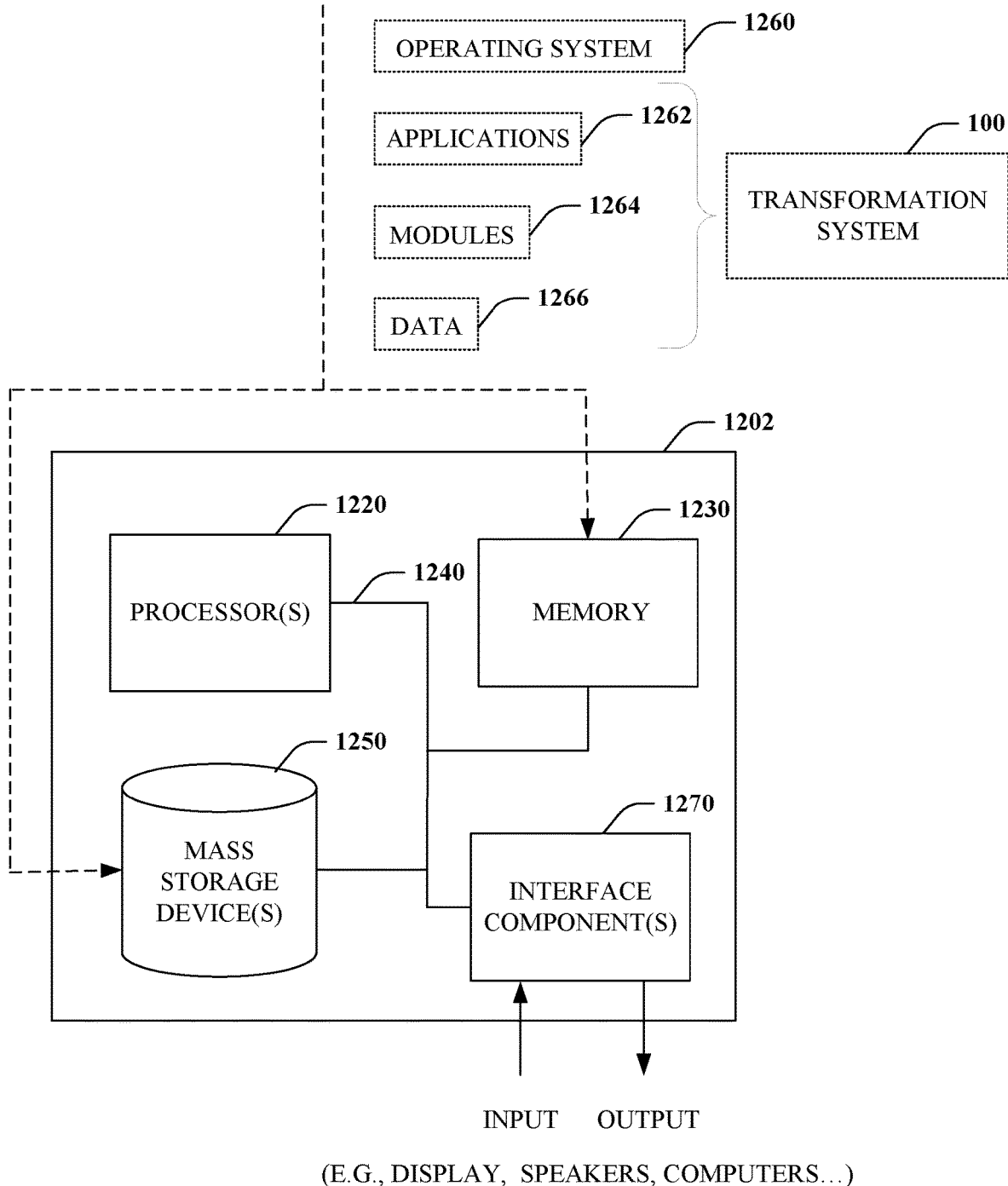
FIG. 12 is a schematic block diagram illustrating a suitable operating environment for aspects of the subject disclosure.

In order to provide a context for the disclosed subject matter, FIG. 12 as well as the following discussion are intended to provide a brief, general description of a suitable environment in which various aspects of the disclosed subject matter can be implemented. The suitable environment, however, is only an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, mainframe computers, as well as personal computers, hand-held computing devices (e.g., personal digital assistant (PDA), smart phone, tablet, watch . . . ), microprocessor-based or programmable consumer or industrial electronics, and the like. Aspects can also be practiced in distributed computing environments where tasks are performed by remote processing devices that are linked through a communications network. However, some, if not all aspects, of the disclosed subject matter can be practiced on stand-alone computers. In a distributed computing environment, program modules may be located in one or both of local and remote memory devices.

With reference to FIG. 12, illustrated is an example general-purpose computer or computing device 1202 (e.g., desktop, laptop, tablet, watch, server, hand-held, programmable consumer or industrial electronics, set-top box, game system, compute node . . . ). The computer 1202 includes one or more processor(s) 1220, memory 1230, system bus 1240, mass storage device(s) 1250, and one or more interface components 1270. The system bus 1240 communicatively couples at least the above system constituents. However, it is to be appreciated that in its simplest form the computer 1202 can include one or more processors 1220 coupled to memory 1230 that execute various computer executable actions, instructions, and or components stored in memory 1230.

The processor(s) 1220 can be implemented with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 1220 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 1220 can be a graphics processor.

The computer 1202 can include or otherwise interact with a variety of computer-readable media to facilitate control of the computer 1202 to implement one or more aspects of the disclosed subject matter. The computer-readable media can be any available media that can be accessed by the computer 1202 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other like mediums that store, as opposed to transmit or communicate, the desired information accessible by the computer 1202. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 1230 and mass storage device(s) 1250 are examples of computer-readable storage media. Depending on the exact configuration and type of computing device, memory 1230 may be volatile (e.g., RAM), non-volatile (e.g., ROM, flash memory . . . ) or some combination of the two. By way of example, the basic input/output system (BIOS), including basic routines to transfer information between elements within the computer 1202, such as during start-up, can be stored in nonvolatile memory, while volatile memory can act as external cache memory to facilitate processing by the processor(s) 1220, among other things.

Mass storage device(s) 1250 includes removable/non-removable, volatile/non-volatile computer storage media for storage of large amounts of data relative to the memory 1230. For example, mass storage device(s) 1250 includes, but is not limited to, one or more devices such as a magnetic or optical disk drive, floppy disk drive, flash memory, solid-state drive, or memory stick.

Memory 1230 and mass storage device(s) 1250 can include, or have stored therein, operating system 1260, one or more applications 1262, one or more program modules 1264, and data 1266. The operating system 1260 acts to control and allocate resources of the computer 1202. Applications 1262 include one or both of system and application software and can exploit management of resources by the operating system 1260 through program modules 1264 and data 1266 stored in memory 1230 and/or mass storage device(s) 1250 to perform one or more actions. Accordingly, applications 1262 can turn a general-purpose computer 1202 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, scaling system 100, or portions thereof, can be, or form part, of an application 1262, and include one or more modules 1264 and data 1266 stored in memory and/or mass storage device(s) 1250 whose functionality can be realized when executed by one or more processor(s) 1220.

In accordance with one particular embodiment, the processor(s) 1220 can correspond to a system on a chip (SOC) or like architecture including, or in other words integrating, both hardware and software on a single integrated circuit substrate. Here, the processor(s) 1220 can include one or more processors as well as memory at least similar to processor(s) 1220 and memory 1230, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the scaling system 100 and/or associated functionality can be embedded within hardware in a SOC architecture.

The computer 1202 also includes one or more interface components 1270 that are communicatively coupled to the system bus 1240 and facilitate interaction with the computer 1202. By way of example, the interface component 1270 can be a port (e.g. serial, parallel, PCMCIA, USB, FireWire . . . ) or an interface card (e.g., sound, video . . . ) or the like. In one example implementation, the interface component 1270 can be embodied as a user input/output interface to enable a user to enter commands and information into the computer 1202, for instance by way of one or more gestures or voice input, through one or more input devices (e.g., pointing device such as a mouse, trackball, stylus, touch pad, keyboard, microphone, joystick, game pad, satellite dish, scanner, camera, other computer . . . ). In another example implementation, the interface component 1270 can be embodied as an output peripheral interface to supply output to displays (e.g., LCD, LED, plasma, organic light-emitting diode display (OLED) . . . ), speakers, printers, and/or other computers, among other things. Still further yet, the interface component 1270 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A system that performs interface transformation adaptive to different display screens, comprising:
a processor coupled to a memory, the processor configured to execute computer-executable instructions stored in the memory that when executed by the processor cause the processor to perform acts comprising:
identifying a first interface element and a second interface element of a user interface that is specified with respect to a baseline display screen;
determining transformations for the first interface element and the second interface element adaptive for display on a target display screen based on target display-screen characteristics and baseline display-screen characteristics, wherein the transformations for the first interface element are determined separate from the second interface element and the transformations are based on a first aspect ratio being applied to the first interface element and a second aspect ratio being applied to the second interface element, the first aspect ratio being based on preserving an aspect ratio of the first interface element, the second aspect ratio being configured to preserve a layout of the second interface element from the baseline display screen to the target display screen, the second aspect ratio being different from the first aspect ratio, the first interface element specifying that the aspect ratio of the first interface element is to be preserved, the second interface element specifying that the layout of the second interface element is to be preserved;
applying the transformations to the first interface element and the second interface element to produce transformed interface elements; and
transmitting the transformed first interface element and second interface element to the target display screen that is configured to display both the first interface element and the second interface element in the same target display screen.

2. The system of claim 1 further comprising:
determining for one of the first interface element or the second interface element that aspect ratio preservation is applicable; and
selecting a uniform scale factor to scale interface element width and height as the transformation.

3. The system of claim 1 further comprising:
determining for one of the first interface element or the second interface element that aspect ratio preservation is inapplicable; and
selecting a differential scale factor to scale interface element width and height as the transformation.

4. The system of claim 1, determining the transformations further comprising computing scale factors for dimensions of an interface element by dividing target display-screen dimensions by corresponding baseline display-screen dimensions, wherein the user interface enables a user to interact with a computer of the target display screen using the user interface.

5. The system of claim 4 further comprising dividing width of a target display-screen by width of the baseline display screen to produce a width scale factor.

6. The system of claim 5 further comprising selecting the width scale factor as a uniform scale factor transformation for an interface element that indicates aspect ratio preservation is applicable.

7. The system of claim 5 further comprises dividing height of the target display screen by the height of the baseline display screen to produce a height scale factor.

8. The system of claim 7 further comprising selecting the height scale factor as a uniform scale factor transformation for an interface element that indicates aspect ratio preservation is applicable.

9. The system of claim 7 further comprising selecting differential scaling by the width scale factor and the height scale factor as the transformation for an interface element for which aspect ratio preservation is inapplicable.

10. A method of user interface transformation performed by a system comprising at least one processor coupled to a memory storing machine-executable instructions, which, when executed by the processor, controls the system to perform acts, comprising:
 identifying a first interface element and a second interface element of a user interface that is specified with respect to a baseline display screen;
 determining transformations for the first interface element and the second interface element adaptive for display on a target display screen based on target display-screen characteristics and baseline display-screen characteristics, wherein the transformations for the first interface element are determined separate from the second interface element and the transformations are based on a first aspect ratio being applied to the first interface element and a second aspect ratio being applied to the second interface element, the first aspect ratio being based on preserving an aspect ratio of the first interface element, the second aspect ratio being configured to preserve a layout of the second interface element from the baseline display screen to the target display screen, the second aspect ratio being different from the first aspect ratio, the first interface element specifying that the aspect ratio of the first interface element is to be preserved, the second interface element specifying that the layout of the second interface element is to be preserved;
 applying the transformations to the first interface element and the second interface element to produce transformed interface elements; and
 transmitting the transformed first interface element and second interface element to the target display screen that is configured to display both the first interface element and the second interface element in the same target display screen.

11. The method of claim 10 further comprising selecting different transformations to apply for the first interface element and the second interface element when aspect ratio preservation is applicable to solely one of the first interface element or the second interface element.

12. The method of claim 10, further comprising selecting the same transformation for the first interface element and the second interface element when aspect ratio preservation is inapplicable for the first interface element and the second interface element or aspect ratio preservation is applicable for the first interface element and the second interface element.

13. The method of claim 10, determining the transformations further comprising dividing width of a target display-screen by width of the baseline display screen to produce a width scale factor, wherein the user interface enables a user to interact with a computer of the target display screen using the user interface.

14. The method of claim 13 further comprising selecting uniform scaling as the transformation, wherein the width scale factor is applied to both the width and height of at least one of the first interface element or the second interface element to preserve aspect ratio.

15. The method of claim 13, determining the transformations further comprising dividing height of the target display screen by height of the baseline display screen to produce a height scale factor.

16. The method of claim 15 further comprising selecting differential scaling as the transformation, wherein the width scale factor is applied to width and the height scale factor is applied to height of at least one of the first interface element or the second interface element.

17. A non-transitory computer-readable storage medium, the computer-readable storage medium including instructions that when executed by a computer, cause the computer to perform operations comprising:
 identifying a first interface element and a second interface element of a user interface that is specified with respect to a baseline display screen;
 determining transformations for the first interface element and the second interface element adaptive for display on a target display screen based on target display-screen characteristics and baseline display-screen characteristics, wherein the transformations for the first interface element are determined separate from the second interface element and the transformations are based on a first aspect ratio being applied to the first interface element and a second aspect ratio being applied to the second interface element, the first aspect ratio being based on preserving an aspect ratio of the first interface element, the second aspect ratio being configured to preserve a layout of the second interface element from the baseline display screen to the target display screen, the second aspect ratio being different from the first aspect ratio, the first interface element specifying that the aspect ratio of the first interface element is to be preserved, the second interface element specifying that the layout of the second interface element is to be preserved;
 applying the transformations to the first interface element and the second interface element to produce transformed interface elements; and
 transmitting the transformed first interface element and the second interface element to the target display screen that is configured to display both the first interface element and the second interface element in the same target display screen.

18. The non-transitory computer-readable storage medium of claim 17, wherein determining transformations further comprises determining different transformations for the first interface element and the second interface element when aspect ratio preservation is applicable to solely one of the first interface element or the second interface element.

19. The non-transitory computer-readable storage medium of claim 17, wherein determining transformations further comprises dividing target display-screen dimensions by corresponding baseline display-screen dimensions generating a width scale factor and a height scale factor.

20. The non-transitory computer-readable storage medium of claim 19, wherein determining transformations further comprises selecting a uniform scale factor of either the width scale factor or the height scale factor to scale width and height of the first interface element and selecting a differential scale factor the width scale factor to the width and the height scale factor to the height of the second interface element.

* * * * *